(12) United States Patent
Totsuka et al.

(10) Patent No.: US 8,535,812 B2
(45) Date of Patent: Sep. 17, 2013

(54) ELECTRICALLY CONDUCTIVE COMPOSITION

(75) Inventors: Shota Totsuka, Sodegaura (JP); Toru Bando, Sodegaura (JP); Shinobu Yamao, Sodegaura (JP); Mitsutake Nakamura, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/414,159

(22) Filed: Mar. 7, 2012

(65) Prior Publication Data

US 2012/0225310 A1 Sep. 6, 2012

Related U.S. Application Data

(63) Continuation of application No. PCT/JP2010/005477, filed on Sep. 7, 2010.

(30) Foreign Application Priority Data

Sep. 7, 2009 (JP) ................................. 2009-206034
Dec. 7, 2009 (JP) ................................. 2009-277807

(51) Int. Cl.
*B32B 27/32* (2006.01)
*H01B 1/00* (2006.01)

(52) U.S. Cl.
USPC ......................................... 428/523; 252/500

(58) Field of Classification Search
None
See application file for complete search history.

(56) References Cited

U.S. PATENT DOCUMENTS

| | | | |
|---|---|---|---|
| 7,101,495 B2 | 9/2006 | Pron et al. | |
| 7,390,439 B2 | 6/2008 | Pron et al. | |
| 2003/0091845 A1 | 5/2003 | Pron et al. | |
| 2006/0076541 A1* | 4/2006 | Yoshida et al. | 252/500 |
| 2006/0278854 A1 | 12/2006 | Pron et al. | |
| 2007/0108420 A1* | 5/2007 | Kuramoto | 252/500 |
| 2008/0017832 A1* | 1/2008 | Funaoka et al. | 252/500 |

FOREIGN PATENT DOCUMENTS

| | | |
|---|---|---|
| JP | 62-149724 | 7/1987 |
| JP | 62-230825 | 10/1987 |
| JP | 7-70312 | 3/1995 |
| JP | 2003-183389 | 7/2003 |
| JP | 2008-75039 | 4/2008 |
| JP | 2009-120762 | 6/2009 |
| JP | 2010-111837 | 5/2010 |
| WO | WO 2005/052058 A1 | 6/2005 |
| WO | WO 2009/084418 A1 | 7/2009 |
| WO | WO 2010/095650 A1 | 8/2010 |

OTHER PUBLICATIONS

International Preliminary Report on Patentability and Written Opinion issued Apr. 19, 2012, in PCT/JP2010/005477.
International Search Report issued Oct. 12, 2010 in PCT/JP2010/005477.
Yong Cao, et al., "Counter-ion induced processibility of conducting polyaniline and of conducting polyblends of polyaniline in bulk polymers", Synthetic Metals, vol. 48, No. 1, Jun. 15, 1992, pp. 91-97.
P N Adams, et al., "A new acid-processing route to polyaniline films which exhibit metallic conductivity and Electrical transport strongly dependent upon intrachain molecular dynamics", J. Phys. Condens. Matter, vol. 10, No. 36, Sep. 14, 1998, pp. 8293-8303.
Yong Cao, et al., "Influence of chemical polymerization conditions on the properties of polyaniline", Polymer, vol. 30, No. 12, Dec. 1989, pp. 2305-2311.

* cited by examiner

*Primary Examiner* — Sheeba Ahmed
(74) *Attorney, Agent, or Firm* — Oblon, Spivak, McClelland, Maier & Neustadt, L.L.P.

(57) ABSTRACT

A conductive composition including:
  a solvent;
  a π-conjugated conductive polymer having a chlorine content of 0.6 wt % or less; and
  a compound represented by the following formula (1);
  wherein the π-conjugated conductive polymer is dissolved and
the weight ratio of the compound represented by the formula (1) to the π-conjugated conductive polymer (compound represented by the formula (1)/π-conjugated conductive polymer) is 0.01 to 22.0.

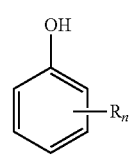

(1)

31 Claims, No Drawings

ELECTRICALLY CONDUCTIVE COMPOSITION

TECHNICAL FIELD

The invention relates to a conductive composition.

BACKGROUND ART

Polyaniline and the like are known materials as a conductive polymer. In addition to its electrical properties, polyaniline has an advantage that it can be synthesized relatively easily from inexpensive aniline and exhibits excellent stability to air or the like in the state that it shows conductivity.

As the method for producing polyaniline, a method in which aniline or an aniline derivative is subjected to oxidative electro-polymerization or chemical oxidative polymerization is known.

As for the oxidative electro-polymerization method, a method in which aniline is polymerized on electrodes is disclosed in Patent Document 1 or Patent Document 2. In the oxidative electro-polymerization, a film having excellent electrical properties is obtained. However, in general, as compared with the chemical oxidative polymerization, the production cost is high in the oxidative electro-polymerization, and hence, the oxidative electro-polymerization is not suited to the large-scale production. In addition, it is difficult to obtain a formed article which has a complicated shape by this method.

On the other hand, in order to obtain a conductive polymer of aniline or an aniline derivative by the chemical oxidative polymerization, a step of protonation in which a dopant (doping agent) is added to polyaniline in the non-conductive base state (the so-called Emeraldine base state) is required.

However, since polyaniline in the non-conductive base state is hardly dissolved in most of organic solvents, it is not suited to the production on the industrial scale. In addition, conductive polyaniline (the so-called Emeraldine base state) generated after protonation is substantially insoluble and non-melting. Therefore, it is difficult to produce a conductive composited material and a formed article thereof easily.

Under such circumstances, as the method for improving doping of polyaniline in the non-conductive base state and affinity of conductive polyaniline after doping for an organic solvent, several proposals were made.

For example, Non-Patent Document 1 states that, by using a protonic acid which has affinity for an organic solvent such as dodecylbenzene sulfonic acid and camphorsulfonic acid (CSA) as the dopant, excellent electrical properties are exhibited.

Patent Document 3 states a method in which polyaniline in the non-conductive base state (adamantane sulfonic acid, for example) is used as a dopant, and this adamantane sulfonic acid is dissolved in m-cresol.

Non-Patent Document 2 discloses a method in which polyaniline in the non-conductive base state is doped in a specific solvent such as 2,2-dichloroacetic acid (halogen-based strong acid) using 2-acrylamide-2-methyl-propane-sulfonic acid as a dopant, for example.

As in the case of Patent Document 2, Patent Document 4 discloses a method in which 2,2-dichloroacetic acid is used as a solvent and polyaniline in the non-conductive base state is doped using di(2-ethylhexyl)ester of sulfosuccinic acid as a dopant.

However, a formed article formed of conductive polyaniline obtained by a method disclosed in Patent Documents 1 to 4 and Non-Patent Documents 1 and 2 is not necessarily excellent in electric properties such as electric conductivity.

In order to increase conductivity of a formed article formed of conductive polyaniline, Patent Document 5 discloses a conductive polyaniline composition comprising (a) a substituted or unsubstituted polyaniline composite material which has been protonated; and (b) a conductive polyaniline composition comprising a compound having a phenolic hydroxyl group, which are dissolved in an organic solvent which is substantially immiscible with water. Further, Patent Document 5 discloses that the amount of the (b) phenolic compound is normally 0.01 to 1000 mass %, preferably 0.5 to 500 mass %, relative to the (a) protonated substituted or unsubstituted polyanilinecomposite material, and discloses a method in which sodium diisooctylsulfosuccinic acid and aniline are dissolved in toluene, hydrochloric acid is added to the resulting solution, the flask is cooled on ice water bath, and a solution obtained by dissolving ammonium persulfate in hydrochloric acid was added dropwise to conduct polymerization of aniline.

In Patent Document 5, aniline is polymerized in the presence of hydrochloric acid. The reason therefor is that higher conductivity can be obtained when conductive polyaniline is synthesized by polymerizing aniline in the presence of aniline. Further, Non-Patent Document 3 states that conductive polyaniline having a high molecular weight cannot be obtained unless aniline is polymerized in the presence of hydrochloric acid. In general, in a polymer, there is a close correlation between the molecular weight and the physical properties of a material. For example, regarding the strength of a film which is formed, a film formed from a polymer having a higher molecular weight has a higher strength. As mentioned above, in the case of polyaniline, when polymerization is conducted by using hydrochloric acid, it is possible to obtain a material which is industrially advantageous. However, in the field of electronic components, since a metal part may corrode when a material containing chloride is used or because of tightening of global environmental regulations in recent years, chlorine-free polyaniline has been demanded.

RELATED ART DOCUMENTS

Patent Documents

Patent Document 1: JP-A-S62-230825
Patent Document 2: JP-A-S62-149724
Patent Document 3: JP-A-H07-70312
Patent Document 4: JP-A-2003-183389
Patent Document 5: WO05/052058

Non-Patent Documents

Non-Patent Document 1: Synthetic metals, 48, 1992, pages 91-97
Non-Patent Document 2: J. Phys.: Condens. Matter, 10, 1998, pages 8293-8303
Non-Patent Document 3: POLYMER: 30, 1989, pages 2305-2311

SUMMARY OF THE INVENTION

An object of the invention is to provide a conductive composition having a small chlorine content and a high conductivity.

According to the invention, the following conductive composition and the like are provided.

1. A conductive composition comprising:
   a solvent;
   a π-conjugated conductive polymer having a chlorine content of 0.6 wt % or less; and
   a compound represented by the following formula (1);
   wherein the π-conjugated conductive polymer is dissolved and
   the weight ratio of the compound represented by the formula (1) to the π-conjugated conductive polymer (compound represented by the formula (1)/π-conjugated conductive polymer) is 0.01 to 22.0;

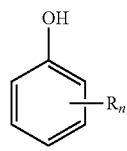

wherein n is an integer of 1 to 5; and
   R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

2. A conductive composition comprising:
   a solvent; and
   a π-conjugated conductive polymer having a chlorine content of 0.6 wt % or less; and
   a compound represented by the following formula (2);
   wherein the π-conjugated conductive polymer is dissolved and
   the weight ratio of the compound represented by the formula (2) to the π-conjugated conductive polymer (compound represented by the formula (2)/π-conjugated conductive polymer) is 0.01 to 5.0;

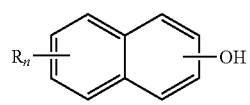

wherein n is an integer of 0 to 6; and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, and an alkylaryl group having 7 to 30 carbon atoms or an arylalkyl group having 7 to 30 carbon atoms.

3. A conductive composition comprising:
   a solvent;
   a π-conjugated conductive polymer which is dissolved; and
   a compound represented by the following formula (1);
   wherein the weight ratio of the compound represented by the formula (1) to the π-conjugated conductive polymer (compound represented by the formula (1)/π-conjugated conductive polymer) is 0.01 to 22.0 and the chlorine content is 0.02 wt % or less;

wherein n is an integer of 1 to 5; and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

4. A conductive composition comprising:
   a solvent;
   a π-conjugated conductive polymer which is dissolved;
   a compound represented by the following formula (2);
   wherein the weight ratio of the compound represented by the formula (2) to the π-conjugated conductive polymer (compound represented by the formula (2)/π-conjugated conductive polymer) is 0.01 to 5.0 and the chlorine content is 0.02 wt % or less;

wherein n is an integer of 0 to 6; and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

5. The conductive composition according to any of 1 to 4, wherein the π-conjugated conductive polymer is a π-conjugated conductive polymer which is doped with an organic sulfonic acid.

6. The conductive composition according to any of 1 to 5, wherein the π-conjugated conductive polymer is any of protonated substituted or unsubstituted polyaniline, protonated substituted or unsubstituted polypyrrole and protonated substituted or unsubstituted polythiophene.

7. The conductive composition according to any of 1 to 6, wherein the π-conjugated conductive polymer is protonated substituted or unsubstituted polyaniline, and the substituted or unsubstituted polyaniline comprises phosphorus.

8. The conductive composition according to 1 or 3, wherein the π-conjugated conductive polymer is protonated substituted or unsubstituted polyaniline,
   the solvent is an alcohol having 3 or more carbon atoms,
   the weight ratio of the alcohol to the substituted unsubstituted polyaniline (alcohol/substituted or unsubstituted polyaniline) is 5.0 to 27.0, and
   the weight ratio of the compound represented by the formula (1) to the substituted or unsubstituted polyaniline (compound represented by the formula (1)/substituted or unsubstituted polyaniline) is 5.0 to 20.0.

9. A conductive composition comprising:
substituted or unsubstituted polyaniline having a chlorine content of 0.6 wt % or less,
a compound represented by the following formula (1), and
an alcohol having 3 or more carbon atoms,
wherein the weight ratio of the alcohol to the substituted or unsubstituted polyaniline (alcohol/substituted or unsubstituted polyaniline) is 12.0 to 27.0,
the weight ratio of the compound represented by the formula (1) to the substituted or unsubstituted polyaniline (compound represented by the formula (1)/substituted or unsubstituted polyaniline) is 5.0 to 20.0, and
the substituted or unsubstituted polyaniline is dissolved;

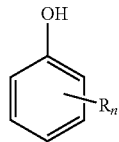

(1)

wherein n is an integer of 1 to 5, and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

10. A conductive composition comprising:
a substituted or unsubstituted polyaniline,
a compound represented by the following formula (1), and
an alcohol having 3 or more carbon atoms,
wherein the weight ratio of the alcohol to the substituted or unsubstituted polyaniline (alcohol/substituted or unsubstituted polyaniline) is 12.0 to 27.0,
the weight ratio of the compound represented by the above formula (1) to the substituted or unsubstituted polyaniline (compound represented by the formula (1)/substituted or unsubstituted polyaniline) is 5.0 to 20.0,
the substituted or unsubstituted polyaniline is dissolved, and
the chlorine content is 0.02 wt % or less;

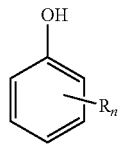

(1)

wherein n is an integer of 1 to 5, and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

11. The conductive composition according to 9 or 10, wherein the chlorine content of the substituted or unsubstituted polyaniline is 0.1 wt % or less.

12. The conductive composition according to any of 9 to 11, wherein the substituted or unsubstituted polyaniline is doped with an organic acid.

13. The conductive composition according to any of 9 to 12, wherein the substituted or unsubstituted polyaniline is protonated by an organic protonic acid or its salt represented by the following formula (3);

$$A\text{-}R_1 \quad (3)$$

wherein A is sulfonic acid, selenic acid, phosphonic acid, carboxylic acid, hydrogen sulfate, hydrogen selenate or hydrogen phosphate; and
$R_1$ is carboxylic acid, an alkyl group having 1 to 20 carbon atoms, an alkenyl group having 1 to 20 carbon atoms, an alkoxy group having 1 to 20 carbon atoms, an alkanoyl group having 1 to 20 carbon atoms, an alkylthio group having 1 to 20 carbon atoms, an alkylthioalkyl group having 1 to 20 carbon atoms, an alkylaryl group having 1 to 20 carbon atoms, an arylalkyl group having 1 to 20 carbon atoms, an alkylsulfinyl group having 1 to 20 carbon atoms, an alkoxyalkyl group having 1 to 20 carbon atoms, an alkylsulfonyl group having 1 to 20 carbon atoms, an alkoxycarbonyl group having 1 to 20 carbon atoms or alkylsuccinic acid having 1 to 20 carbon atoms.

14. The conductive composition according to any of 9 to 13, wherein the substituted or unsubstituted polyaniline comprises phosphorus.

15. The conductive composition according to any of 1 to 14, which further comprises phosphorus.

16. A conductive layered product comprising:
a substrate; and
a conductive layer comprising the conductive composition according to any of 1 to 15, wherein the conductive layer is stacked on the substrate.

17. A conductive layered product comprising:
a substrate; and
a conductive layer produced from the conductive composition according to any of 1 to 15, wherein the conductive layer is stacked on the substrate.

18. The conductive layered product according to 16 or 17, wherein the substrate is a resin film.

19. A conductive product obtained by forming the conductive layered product according to any of 16 to 18.

20. A condenser which comprises the conductive composition according to any of 1 to 15.

21. A conductive film obtained by forming the conductive composition according to any of 1 to 15.

22. A conductive product obtained by mixing the conductive composition according to any of 1 to 15 and a substrate.

According to the invention, it is possible to provide a conductive composition which has a small amount of chloride and has a high conductivity.

MODE FOR CARRYING OUT THE INVENTION

The first conductive composition of the invention is a conductive composition comprising:
a solvent;
a π-conjugated conductive polymer having a chlorine content of 0.6 wt % or less; and
a compound represented by the following formula (1);
wherein the π-conjugated conductive polymer is dissolved and
the weight ratio of the compound represented by the formula (1) to the π-conjugated conductive polymer (compound represented by the formula (1)/π-conjugated conductive polymer) is 0.01 to 22.0;

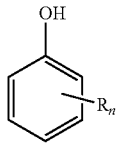
(1)

wherein n is an integer of 1 to 5; and

R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

Since the first conductive composition of the invention comprises the "compound represented by the formula (1)" (hereinbelow appropriately referred to as the "phenolic compound") and the "conductive polymer having a low chlorine content", it is possible to obtain a formed article having a high conductivity. Since the π-conjugated conductive polymer contained in the first conductive polymer of the invention has a chlorine content of 0.6 wt % or less, the first conductive composition of the invention has a small possibility of corroding a metal.

The π-conjugated conductive polymer contained in the first conductive polymer of the invention is dissolved. Here, the "dissolved" means that the π-conjugated conductive polymer is homogeneously dissolved in a solvent in the molecular state. As a result, a coating film of the π-conjugated conductive polymer which is uniform having no grain boundary when drying the composition can be obtained.

It is assumed that the π-conjugated conductive polymer is dissolved in a mixture of a solvent and the "compound represented by the formula (1)".

The chlorine content of the π-conjugated conductive polymer contained in the first conductive composition of the invention is 0.6 wt % or less, preferably 0.1 wt % or less, more preferably 0.04 wt % or less and further preferably 0.0001 wt % or less. The chlorine content is a value measured by the combustion-ion chromatography method.

If the chlorine content of the π-conjugated conductive polymer exceeds 0.6 wt %, a metal part which contacts the π-conjugated conductive polymer may corrode.

The π-conjugated conductive polymer contained in the first conductive composition of the invention preferably has a weight-average molecular weight of 1,000 or more, more preferably 1,000 to 1,000,000.

Specific examples of the π-conjugated conductive polymer include polyaniline, polypyrrole, polythiophene, poly(p-phenylene), poly(p-phenylenevinylene), which are substituted or unsubstituted, and the derivatives thereof.

If the π-conjugated conductive polymer is substituted or unsubstituted polyaniline, the weight-average molecular weight of polyaniline is preferably 20,000 or more, more preferably 50,000 or more, further preferably 50,000 or more and 1,000,000 or less. If the weight-average molecular weight of polyaniline is less than 20,000, the strength or stretchability of a conductive product obtained from a composition may be lowered.

The molecular weight distribution is preferably 1.5 to 10.0. In respect of conductivity, a narrower molecular weight distribution is preferable.

The molecular weight and the molecular weight distribution as mentioned above are values measured by gel permeation chromatography (GPC).

Examples of the substituent of the substituted polyaniline include a straight-chain or branched hydrocarbon group such as methyl, ethyl, hexyl and octyl; an alkoxyl group such as methoxy and phenoxy; an aryloxy group; and a halogen-containing hydrocarbon group such as $CF_3$.

It is preferred that the π-conjugated conductive polymer be doped with an electron-accepting substance. Here, an electron-accepting substance can be used without particularly being restricted for the chemical structure as long as it has electron-accepting ability which is sufficient for generating carriers on the π-conjugated conductive polymer. It is preferred that the π-conjugated conductive polymer be doped with an electron-accepting substance such as Bronsted acid and Lewis acid. It is more preferred that the π-conjugated conductive polymer be doped with an organic sulfonic acid. Examples of the organic sulfonic acid include an alkylsulfonic acid such as methanesulfonic acid and ethanesulfonic acid; aromatic sulfonic acid such as paratoluenesulfonic acid, dodecylbenzenesulfonic acid and isopropylnaphthalenesulfonic acid; and sulfosuccinic acid. Salts of these acids (sodium salts, etc.) can be given.

It is known that, by changing the structure, the dopant can control the conductivity or solubility in a solvent of the π-conjugated conductive polymer (Japanese Patent No. 3384566). In the invention, an optimum dopant can be chosen according to required properties for application.

The doping ratio a of the π-conjugated conductive polymer which is doped is preferably 0.42 to 0.60, more preferably 0.43 to 0.57, further preferably 0.44 to 0.55 if the above-mentioned π-conjugated conductive polymer is polyaniline. If the doping ratio a of polyaniline is 0.42 or less, solubility in an organic solvent may not be increased.

If the π-conjugated conductive polymer is polypyrrole, it is preferred that $0<a<0.5$, more preferably $0.25<a<0.35$.

Meanwhile, the above-mentioned doping ratio is generally defined by (the number of moles of dopant molecules with which the conductive polymer is doped)/(the monomer unit of conductive polymer). For example, if the doped π-conjugated conductive polymer is a polyaniline composite, a doping ratio a of the dopant of 0.5 means that one molecule of a dopant is doped for two nitrogen molecules. It is preferred that the conductivity become highest at this value or in the vicinity of this value.

The doped π-conjugated conductive polymer is preferably protonated substituted or unsubstituted polyaniline, protonated substituted or unsubstituted polypyrrole or substituted or unsubstituted polythiophene, more preferably protonated substituted or unsubstituted polyaniline.

The substituted or unsubstituted polyaniline is preferably a substituted or unsubstituted polyaniline doped with an electron-accepting substance, more preferably, the substituted or unsubstituted polyaniline is substituted or unsubstituted polyaniline which is protonated by an organic protonic acid or its salts represented by the following formula (3):

$$A\text{-}R_1 \qquad (3)$$

wherein A is sulfonic acid ($SO_3H$), selenic acid ($SeO_3H$), phosphonic acid ($PO_3H$), carboxylic acid ($CO_2H$), hydrogen sulfate ($SO_3Na$ or the like), hydrogen selenate ($SeO_3Na$ or the like) or hydrogen phosphate ($PO_3Na$ or the like).

$R_1$ is carboxylic acid, an alkyl group having 1 to 20 carbon atoms, an alkenyl group having 1 to 20 carbon atoms, an alkoxy group having 1 to 20 carbon atoms, an alkanoyl group having 1 to 20 carbon atoms, an alkylthio group having 1 to 20 carbon atoms, an alkylthioalkyl group having 1 to 20 carbon atoms, an alkylaryl group having 1 to 20 carbon atoms, an arylalkyl group having 1 to 20 carbon atoms, an alkylsulfinyl group having 1 to 20 carbon atoms, an alkoxyalkyl group having 1 to 20 carbon atoms, an alkylsulfonyl group having 1 to 20 carbon atoms, an alkoxycarbonyl group having 1 to 20 carbon atoms, an alkylsuccinic acid having 1 to 20 carbon atoms or a substituent represented by the following formula (4):

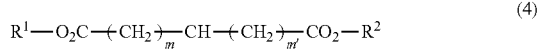

(4)

wherein $R^{11}$ and $R^{12}$ are independently a straight-chain or branched alkyl group having 1 to 12 carbon atoms; m and m' are independently 0 to 3; and A is bonded to —CH—.

The organic protonic acid or its salt represented by the formula (3) is preferably represented by the following formula (5):

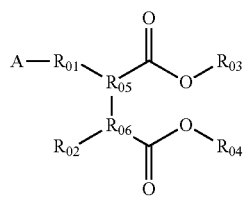

(5)

wherein $R_{01}$ is a single bond or an alkylene group having 1 to 4 carbon atoms; $R_{02}$ is a hydrogen atom or an alkyl group having 1 to 4 carbon atoms; $R_{05}$ and $R_{06}$ are independently a methine group or an ethine group, with an ethine group being preferable;

$R_{01}$, $R_{02}$, $R_{05}$ and $R_{06}$ may form a ring structure, and the ring structure is preferably cycloalkane, with cycloalkane having 4 to 8 carbon atoms being preferable;

$R_{03}$ and $R_{04}$ are independently a hydrogen atom or an alkyl group having 4 to 24 carbon atoms; if $R_{03}$ and $R_{04}$ are an alkyl group, the alkyl group is preferably a branched alkyl group; and A is as defined in the formula (3).

The alkyl group, the alkylene group and the cycloalkane of $R_{01}$ to $R_{06}$ may further have a substituent. The alkyl group and the alkylene group may be branched.

Specific examples of the above-mentioned electron-accepting substance include the same as the electron-accepting substance used in the above-mentioned π-conjugated conductive polymer.

As the substituted or unsubstituted polyaniline as the π-conjugated conductive polymer, polyaniline which is obtained by polymerization in the presence of an acid containing no chlorine is preferable. For example, polyaniline which is obtained by polymerization in the presence of phosphoric acid can be given. By this polymerization, the chlorine content of the substituted or unsubstituted polyaniline can be further decreased.

Here, it is preferred that the substituted or unsubstituted polyaniline obtained by polymerization in the presence of phosphoric acid be substituted or unsubstituted polyaniline which is doped with an electron-accepting substance. By mixing the substituted or unsubstituted polyaniline which is doped by an electron-accepting substance with the compound represented by the formula (1) or (2) at a specific mixing ratio, a high conductivity can be obtained.

A substance which is preferable as the electron-accepting substance is as mentioned above.

The substituted or unsubstituted polyaniline may or may not contain phosphorus.

If it contains phosphorus, the content of phosphorus is 10 wt ppm or more and 5000 wt ppm or less, for example. The content of phosphorus can be measured by the inductively coupled plasma atomic emission spectroscopy.

The above-mentioned content of phosphorus is more preferably 1,000 ppm or less, further preferably 500 ppm or less, with 250 ppm or less being most preferable.

Further, the first conductive composition of the invention may or may not contain phosphorus.

If it contains phosphorus, the content thereof is preferably 100 wt ppm or less. It is preferred that the substituted or unsubstituted polyaniline contain no $12^{th}$ group of elements (zinc, for example) as an impurity.

In the compound represented by the formula (1) which is contained in the first conductive composition of the invention, the substitution position of R is preferably the meta- or para-position relative to the phenolic hydroxyl group.

By allowing the substitution position of R to be the meta- or para-position, the steric hindrance of the phenolic hydroxyl group can be suppressed, whereby a composition having a higher conductivity can be obtained.

Examples of the alkyl group having 2 to 10 carbon atoms of R include ethyl, propyl, isopropyl, butyl, isobutyl and tert-butyl.

As the alkenyl group of R, an alkenyl group having an unsaturated bond within the molecule of the above-mentioned alkyl group can be given.

As the cycloalkyl group, cyclopentyl, cyclohexyl or the like can be given.

As the alkylthio group, methylthio, ethylthio or the like can be given.

As the aryl group, phenyl, naphthyl or the like can be given.

As the alkylaryl group and the arylalkyl group, a group obtained by combining the alkyl group and the aryl group mentioned above can be given.

R is preferably an alkyl group having 2 to 10 carbon atoms, more preferably an alkyl group having 2 to 8 carbon atoms, and further preferably an alkyl group having 2 to 5 carbon atoms.

In the first conductive composition of the invention, the weight ratio of the "compound represented by the formula (1)" to the π-conjugated conductive polymer (compound represented by the formula (1)/π-conjugated conductive polymer) is 0.01 to 22.0. The weight ratio can be appropriately set within the range of 0.01 to 22.0 according to required properties for application. In order to attain well-balanced conductivity and film strength, the weight ratio is preferably 0.01 to 10.0, with 0.05 to 5.0 being more preferable.

In order to increase conductivity, the weight ratio is preferably 5.0 to 22.0.

The "(compound represented by the formula (1)/π-conjugated conductive polymer) means {compound (g) represented by the formula (1) contained in the first conductive composition of the invention}/{π-conjugated conductive polymer (g) contained in the first conductive composition of the invention}.

If the above-mentioned weight ratio is less than 0.01, the conductivity may not be increased. On the other hand, if the weight ratio exceeds 22.0, the strength of a film obtained from the conductive composition may be decreased.

The solvent may be an inorganic solvent or an organic solvent. However, an organic solvent is preferable. An organic solvent may be an organic solvent which is substantially immiscible with water (water-immiscible organic solvent) or a water-soluble organic solvent.

Examples of the water-immiscible organic solvent include a hydrocarbon-based solvent such as benzene, toluene, xylene, ethylbenzene and tetraline, a halogen-containing solvent such as methyl chloride, chloroform, carbon tetrachloride, dichloroethane and tetrachloroethane; and an ester-based solvent such as ethyl acetate. Of these, toluene, xylene, chloroform, trichloroethane and ethyl acetate are preferable since they have excellent solubility for doped polyaniline.

As the water-soluble organic solvent, an alcohol having 3 or more carbon atoms; a ketone such as acetone and methyl ethyl ketone; a polar ether such as tetrahydrofuran and dioxane; and a non-protonic polar solvent such as N-methylpyrrolidone can be given.

As the solvent, an alcohol having 3 or more carbon atoms is preferable.

The above-mentioned alcohol having 3 or more carbon atoms is preferably an alkyl alcohol having 3 or more carbon atoms or a cycloalkyl alcohol having 3 or more carbon atoms, more preferably, an alkyl alcohol having 3 or more and 10 or less carbon atoms or a cycloalkyl alcohol having 3 or more and 10 or less carbon atoms, further preferably, an alkyl alcohol having 3 or more and 8 or less carbon atoms or a cycloalkyl alcohol having 3 or more and 8 or less carbon atoms, and most preferably, an alkyl alcohol having 3 or more and 6 or less carbon atoms or a cycloalkyl alcohol having 3 or more and 6 or less carbon atoms. The alkyl alcohol may or may not have a substituent, and may or may not be branched.

The cycloalkyl alcohol may or may not have a substituent.

Specific examples include n-propanol, isopropanol, 1-butanol, 2-methylpropanol, 2-butanol, tert-butanol, 1-pentanol, 2-methylbutanol, 3-methylbutanol, 4-methylbutanol, 2-methyl-2-butanol, 3-methyl-2-butanol, 2,2'-dimethylpropanol, cyclopentanol, 1-hexanol, 2-hexanol, 3-hexanol, 2-methylpentanol, 2-methyl-2-pentanol, 3-methylpentanol, 3-methyl-2-pentanol, 3-methyl-3-pentanol, 4-methylpentanol, 4-methyl-2-pentanol and cyclohexanol.

For a solvent, it is preferred that a mixed organic solvent of a water-immiscible organic solvent and a water-soluble organic solvent be used in a mass ratio of 99 to 50:1 to 50. By using such a solvent, generation of gel or the like can be suppressed when storing the composition of the invention.

As the water-immiscible organic solvent of the mixed organic solvent, a low-polar organic solvent can be used. For example, toluene and chloroform are preferable. As the water-soluble organic solvent of the mixed organic solvent, a high-polar organic solvent can be used. For example, alcohols such as methanol, ethanol, isopropyl alcohol, 2-methoxyethanol and 2-ethoxyethanol; ketones such as acetone, methyl ethyl ketone and methyl isobutyl ketone; and tetrahydrofuran or diethyl ether are preferable.

No specific restrictions are imposed on the ratio of the π-conjugated conductive polymer in the conductive composition as long as the π-conjugated conductive polymer is dissolved in the conductive composition. The ratio of the π-conjugated conductive polymer in the conductive composition in order to allow the π-conjugated conductive polymer to be dissolved in the conductive composition is normally 900 g/kg or less, although it varies depending on the type of a solvent. The lower limit is not particularly restricted. However, the lower limit is preferably 0.01 or more and 900 g/kg or less, with 0.01 to 300 g/kg with being more preferable. If the content of the π-conjugated conductive polymer is too large, the solution state cannot be maintained. As a result, handling of the composition when forming a formed article may be difficult, uniformity of a formed article may be deteriorated and electric properties, mechanical strength or transparency of a formed article may be lowered. On the other hand, if the content of the π-conjugated conductive polymer is too small, if a conductive film is formed by the method mentioned below, only a very thin film can be produced, leading to difficulty in the production of a homogeneous conductive film. The ratio of the π-conjugated conductive polymer in the conductive composition is further preferably 10 g/kg or more and 300 g/kg or less, with 30 g/kg or more and 300 g/kg or less being most preferable.

The second conductive composition of the invention is a conductive composition comprising:
a solvent; and
a π-conjugated conductive polymer having a chlorine content of 0.6 wt % or less; and
a compound represented by the following formula (2);
wherein the π-conjugated conductive polymer is dissolved and
the weight ratio of the compound represented by the formula (2) to the π-conjugated conductive polymer (compound represented by the formula (2)/π-conjugated conductive polymer) is 0.01 to 5.0;

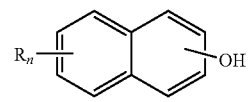

(2)

wherein n is an integer of 0 to 6; and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms and an aryl group having 6 to 20 carbon atoms, and an alkylaryl group or an arylalkyl group.

The second conductive composition of the invention and the first conductive composition of the invention differ in that the "compound represented by the formula (1)" is changed to the "compound represented by the formula (2)" and the weight ratio of the "compound represented by the formula (1)" to the π-conjugated conductive polymer is changed to the weight ratio of the "compound represented by the formula (2)" to the π-conjugated conductive polymer (weight ratio is also changed), and other features are the same. Therefore, only the different features are stated, and the description of the common features is omitted.

Since the second conductive composition of the invention comprises the compound represented by the formula (2) and a conductive polymer having a low chlorine content, a formed article having a high conductivity can be obtained. Further, as in the case of the first conductive composition of the invention, the π-conjugated conductive polymer contained in another conductive composition of the invention has a chlorine content of 0.6 wt % or less. Therefore, this conductive composition has little fear of corroding a metal.

Meanwhile, the π-conjugated conductive polymer is assumed to be dissolved in a mixture of the compound represented by the formula (2) and a solvent.

R of the compound represented by the formula (2) is the same as R of the compound represented by the formula (1).

In the second conductive composition of the invention, the weight ratio of the "compound represented by the formula (2)" to the π-conjugated conductive polymer (compound represented by the formula (2)/π-conjugated conductive polymer) is 0.01 to 5.0. The weight ratio can be appropriately set within the range of 0.01 to 5.0 according to required properties for application. In order to attain well-balanced conductivity and film strength, the weight ratio is preferably 0.01 to 2.0.

If the above-mentioned weight ratio is less than 0.01, a high conductivity obtained by adding the compound represented by the formula (2) may not be obtained. On the other hand, if the weight ratio exceeds 5.0, the strength of a film obtained from the conductive composition may be decreased.

The chlorine content of the third and fourth conductive composition of the invention are 0.02 wt % or less, more preferably 0.01 wt % ore less, further preferably 0.005 wt % or less, more further preferably 0.0001 wt % or less.

The chlorine content is a value measured by the combustion-ion chromatography method.

While the chlorine content of the π-conjugated conductive polymer in the first conductive composition of the invention is 0.6 wt % or less, the chlorine content of the π-conjugated conductive polymer in the third conductive composition of the invention is not particularly restricted. The first conductive composition of the invention and the third conductive composition of the invention differ in that the chlorine content of the third conductive composition is 0.02 wt % or less, and other features of the third conductive composition of the invention and the first conductive composition are the same.

While the chlorine content of the π-conjugated conductive polymer in the second conductive composition of the invention is 0.6 wt % or less, the chlorine content of the fourth conductive composition of the invention is not particularly restricted. The second conductive composition of the invention and the fourth conductive composition of the invention differ in that the chlorine content of the fourth conductive composition is 0.02 wt % or less, and other features of the fourth conductive composition of the invention and the second conductive composition are the same.

Therefore, of the features of the third conductive composition of the invention, description on the same features as those of the first conductive composition of the invention is omitted.

Of the features of the fourth conductive composition of the invention, description on the same features as those of the second conductive composition of the invention is omitted.

It is preferred that the first conductive composition, the second conductive composition, the third conductive composition and the fourth conductive composition of the invention be a conductive composition in which the π-conjugated conductive polymer is protonated substituted or unsubstituted polyaniline. The substituted or unsubstituted polyaniline may contain phosphorus.

In the first conductive composition and the third conductive composition of the invention, it is preferred that the π-conjugated conductive polymer be protonated substituted or unsubstituted polyaniline, that the solvent be an alcohol having 3 or more carbon atoms, that the weight ratio of the alcohol to the substituted or unsubstituted polyaniline (alcohol/substituted or unsubstituted polyaniline) be 5.0 to 27.0, and that the weight ratio of the compound represented by the formula (1) to the substituted or unsubstituted polyaniline (compound represented by the formula (1)/substituted or unsubstituted polyaniline) be 5.0 to 20.0.

By allowing the weight ratio of alcohol to the substituted or unsubstituted polyaniline and the weight ratio of the compound represented by the formula (1) to the substituted or unsubstituted polyaniline to be within a predetermined range, a lower chlorine content, use of alcohol as a solvent and a high conductivity can be realized.

In addition, by using alcohol as a solvent, a compound giving out only weak odor can be obtained as compared with the case when an aromatic compound is used as a solvent.

The "alcohol/substituted or unsubstituted polyaniline" means "the amount of alcohol (g) in the conductive composition/'substituted or unsubstituted polyaniline' (g) contained in the conductive composition".

Alcohols having 3 or more carbon atoms are the same as those mentioned above.

The "compound represented by the formula (1)/substituted or unsubstituted polyaniline" means the "'compound (g) represented by the formula (1)'/substituted or unsubstituted polyaniline (g) contained in the conductive composition".

The π-conjugated conductive polymer in the composition of the invention can be produced by the following method, for example.

The π-conjugated conductive polymer (protonated substituted or unsubstituted polyaniline, for example) can be obtained by the double-layer polymerization method in which a solvent which is not substantially dissolved in water and phosphoric acid are used.

In the above-mentioned double-layer polymerization method, a salt of an electron-accepting substance (sodium sulfosuccinate, for example) is dissolved in a solvent which is not substantially dissolved in water, aniline is added, and phosphoric acid is further added, whereby a π-conjugated conductive polymer (protonated substituted or unsubstituted polyaniline, for example) can be obtained.

The conductive composition of the invention containing alcohol as a solvent (hereinafter appropriately referred to as the "first alcohol-containing conductive composition") preferably comprises a substituted or unsubstituted polyaniline having a chlorine content of 0.6 wt % or less, a phenolic compound represented by the formula (1) and alcohol having 3 or more carbon atoms, in which the weight ratio of the alcohol having 3 or more carbon atoms to the substituted or unsubstituted polyaniline (alcohol/substituted or unsubstituted polyaniline) is 5.0 to 27.0 and the weight ratio of the phenolic compound to the substituted or unsubstituted polyaniline (phenolic compound/substituted or unsubstituted polyaniline) is 5.0 to 22.0. In this conductive composition, the substituted or unsubstituted polyaniline is dissolved.

Here, there is a possibility that the substituted or unsubstituted polyaniline is dissolved in a mixture of the alcohol and the phenolic compound.

By using alcohol as all or part of the solvent, as compared with the case where an aromatic compound is used as the solvent, a composition which gives out weak odor can be obtained.

The first alcohol-containing conductive composition and the second alcohol-containing conductive composition differ in that, while in the first alcohol-containing conductive composition, the chlorine content of the substituted or unsubstituted polyaniline is 0.6 wt % or less, in the second alcohol-containing conductive composition of the invention, the chlorine content of the substituted or unsubstituted polyaniline is not restricted, and the chlorine content of the second alcohol-containing conductive composition is 0.02 wt % or less. As for other features, the second alcohol-containing conductive composition is the same as the first alcohol-containing conductive composition.

The alcohol having 3 or more carbon atoms is preferably an alcohol having 3 or more and 10 or less carbon atoms, more preferably an alcohol having 3 or more and 8 or less carbon atoms, and most preferably an alcohol having 3 to 6 carbon atoms. In the case of an alcohol having 3 to 6 carbon atoms, excellent solubility and conductivity can be obtained.

These alcohols may be an alcohol having a straight-chain structure or an alcohol having a branched structure.

Specific examples of the alcohol having 3 or more carbon atoms include n-propanol, isopropanol, 1-butanol, 2-methylpropanol, 2-butanol, tert-butanol, 1-pentanol, 2-methylbutanol, 3-methylbutanol, 4-methylbutanol, 2-methyl-2-butanol, 3-methyl-2-butanol, 2,2'-dimethylpropanol, cyclopenanol, 1-hexanol, 2-hexanol, 3-hexanol, 2-methylpentanol, 2-methyl-2-pentanol, 3-methylpentanol, 3-methyl-2-pentanol, 3-methyl-3-pentanol, 4-methylpentanol, 4-methyl-2-pentanol and cyclohexanol.

The phenolic compound is preferably a monovalentphenol, more preferably a mononuclear, monovalent phenol. Such a phenol has excellent solubility for alcohol, and therefore good conductivity can be obtained.

Specific examples of the phenolic compound include ethyl phenol, propyl phenol, isopropyl phenol, butyl phenol, tert-butyl phenol, pentyl phenol, hexyl phenol and octyl phenol.

In the above-mentioned alcohol-containing conductive composition, the weight ratio of the alcohol and the substituted or unsubstituted polyaniline (alcohol/substituted or unsubstituted polyaniline) is 12.0 to 27.0, preferably 5 to 22.

If the above-mentioned weight ratio is less than 10.0, a homogenous solution may not be obtained.

If the above-mentioned weight ratio exceeds 27.0, film formation may be difficult.

The first to fourth conductive compositions and the first and second alcohol-containing conductive compositions (hereinafter, they are comprehensively referred to as the composition of the invention) may or may not contain phosphorus.

If they contain phosphorus, the content of phosphor is 10 wt ppm or more and 500 wt ppm or less, for example. The content of phosphorus can be measured by the inductively coupled plasma atomic emission spectroscopy.

The first to fourth conductive compositions of the invention may substantially consist of the above-mentioned π-conjugated conductive polymer, the phenolic compound represented by the formula (1) or a compound represented by the formula (2) in which a naphthalene ring is substituted by a hydroxyl group and a solvent, or may consist only of these components.

The first and second alcohol-containing conductive compositions of the invention may substantially consist of the above-mentioned substituted or unsubstituted polyaniline, the phenolic compound represented by the formula (1) and the alcohol having 3 or more carbon atoms, or may consist only of these components.

The composition of the invention may contain other resins, inorganic materials, hardening agents, plasticizers or the like insofar as the advantageous effects of the invention are not impaired.

Other resins are added as a binder substrate, a plasticizer, a matrix substrate or the like. Specific examples thereof include a polyolefin such as polyethylene and polypropylene, polystyrene, polyester, polyamide, polyacetal, polyethylene terephthalate, polycarbonate, polyethylene glycol, polyethylene oxide, polyacrylic acid, polyacrylic acid ester, polymethacrylic acid ester and polyvinyl alcohol.

Instead of or together with a resin, a precursor which is capable of forming a thermosetting resin such as an epoxy resin, a urethane resin and a phenol resin may be used.

An inorganic material is added in order to improve strength, surface hardness, dimension stability or other mechanical properties. Specific examples thereof include silica (silicon dioxide), titania (titanium oxide) and alumina (aluminum oxide).

A hardening agent may be added in order to improve strength, surface hardness, dimension stability or other mechanical properties. Specific examples thereof include a thermosetting agent such as a phenolic resin and a light curing agent formed of an acrylic monomer and a photopolymerization initiator.

A plasticizer is added in order to improve mechanical properties such as tensile strength and flexural strength. Specific examples thereof include phthalic esters and phosphoric esters.

The composition of the invention can be prepared by a known method. For example, it can be prepared by a method disclosed in WO05/052058.

A conductive formed article can be obtained from the composition of the invention. For example, by applying the composition of the invention to a substrate such as glass, a film or sheet of a resin and unwoven fabric having a specific shape and by removing an organic solvent, a conductive layered product having a conductive film (surface conductive product) can be produced.

For example, by forming a conductive layered product of the invention into a desired shape by a known method such as vacuum forming and pressure forming, a conductive product can be obtained. In respect of forming, a resin film or sheet is preferable as the substrate.

As the method for applying the composition to a substrate, a known, common method such as a casting method, a spraying method, a dip coating method, a doctor blade method, a bar coating method, a spin coating method, an electro-spinning method, a screen printing method, a gravure printing method or the like can be used.

When drying a coating film, a coating film may be heated according to the type of an organic solvent. For example, a coating film is dried at a temperature of 250° C. or less, preferably 50 to 200° C. in the stream of air. Further, according to need, the coating film is heated under reduced pressure. No specific restrictions are imposed on the heating temperature and the heating time. The heating temperature and the heating time may be appropriately selected according to the material used.

A conductive film can be produced by removing an organic solvent from the composition of the invention. If the formed article of the invention is a membrane or a film, the thickness thereof is normally 1 mm or less, preferably in a range of 10 nm to 50 μm. A film having a thickness within this range has advantages that it hardly undergoes cracking during film formation and has uniform electric properties.

The composition of the invention may be mixed with a substrate to form a conductive product.

Examples of the substrate include a polyolefin such as polyethylene and polypropylene; thermoplastic resins such as polystyrene, polyester, polyamide, polyacetal, polycarbonate, polyethylene glycol, polyethylene oxide, polyacrylic acid, polyacrylic acid ester, polymethacrylic acid ester and polyvinyl alcohol; and thermosetting resins such as an epoxy resin, a phenol resin and a urethane resin.

The composition of the invention can be formed into a self-supporting formed article having no substrate. When it is formed into a self-supporting formed article, it is preferred that the composition comprise other resins as mentioned above. If other resins are contained, it is possible to obtain a formed article having a desired mechanical strength.

EXAMPLES

Production Example 1

Production of Polyaniline Composite 1

1.8 g of Aerosol OT (sodium dioctyl sulfosuccinate) was dissolved in 50 mL of toluene. The resulting solution was placed in a 500 mL-separable flask in the nitrogen stream. Further, 1.8 mL of aniline was added to this solution. Thereafter, 150 mL of 1 mol/l phosphoric acid was added to the solution, and the solution temperature was cooled to 5° C. When the internal temperature of the solution reached 5° C., a solution obtained by dissolving 3.6 g of ammonium persulfate in 50 mL of 1 mol/l phosphoric acid was added dropwise for 2 hours by means of a dropping funnel. For 18 hours after the start of the dropwise addition, a reaction was conducted while keeping the internal temperature at 5° C. Thereafter, 125 mL of toluene was added, the reaction temperature was increased to 25° C. The reaction was continued for 4 hours. Thereafter, by allowing the solution to stand, the solution was separated into two phases. An aqueous phase was separated, and a toluene phase was washed twice with ion exchange water, and once with 50 mL of 1 mol/l phosphoric acid, whereby a toluene solution of polyaniline composite (protonated polyaniline) was obtained.

A small amount of insoluble matters contained in the resulting composite solution was removed by means of #5C filter paper, whereby the polyaniline composite toluene solution was collected. This solution was transferred to an evaporator, and heated in a hot water bath of 60° C. The pressure was reduced to distill volatile matters off, whereby 1.25 g of a polyaniline composite 1 was obtained.

The chlorine content of the thus prepared polyaniline composite 1 was measured by the combustion-ion chromatography method, and the chlorine content was confirmed to be 0.0001 wt % or less. Therefore, the chlorine content of the polyaniline composite 1 was 0.0001 wt % or less.

Here, the combustion-ion chromatography was conducted by using DX-120 manufactured by DIONEX.

A chlorine content of 0.0001 wt % or less cannot be measured by this method. Since the measurement result of the polyaniline composite 1 was equal to or smaller than the detection limit, it was confirmed that the chlorine content of the polyaniline composite 1 was 0.0001 wt % or less.

The phosphorus content of the thus prepared polyaniline composite 1 was measured by the inductively coupled plasma atomic emission spectroscopy method (hereinafter referred to as the "ICP method"), it was confirmed that the phosphorus content was 250 wt ppm.

Here, the ICP method was conducted by using SPS5100 manufactured by the SSI Nano Technology Inc.

In the ICP method, since measurement cannot be conducted if the content of phosphorus is 100 wt ppm or less, it can be confirmed that the phosphorus content is 100 wt ppm or less if it is equal to or smaller than the measureable limit value.

Production Example 2

Production of Polyaniline Composite 2

(1) Synthesis of sodium 3,4-bis[(2-ethylhexyl)oxycarbonyl]cyclohexanesulfonate

In the stream of an argon gas, 80 g of 4-cyclohexene-1,2-dicarboxylic di(2-ethylhexyl)ester (manufactured by Tokyo Chemical Industry Co., Ltd.) and 900 mL of isopropyl alcohol was placed. 660 mL of an aqueous solution of 42.3 g of sodium hydrogen sulfite (manufactured by Wako Pure Chemical Industries, Ltd.) was added. The resulting solution was heated to a reflux temperature, and stirred at 80 to 83° C. for 16 hours. During this stirring, every one hour from the start to 1 to 5 hours after the start of refluxing, as well as after 9 hours and 10 hours, 1.66 g of 2,2'-azobis(isobutyronitrile) (manufactured by Wako Pure Chemical Ltd.) was added. After cooling to room temperature, the reaction liquid was concentrated under reduced pressure.

The resulting concentrated residue was dissolved in 1 L of a mixed solution of ethyl acetate and hexane. 250 g of silica gel was added and stirred, and the solution was filtered out. Further, extraction was conducted twice from silica gel with 1 L of an ethyl acetate/hexane solution. Filtrates were mixed and concentrated under reduced pressure. The thus concentrated liquid was purified by column chromatography (silica gel 1500 g, eluent: ethyl acetate/hexane) and dried with anhydrous sodium sulfite. The solvent was then distilled off under reduced pressure, whereby 52.4 g of sodium 3,4-bis[(2-ethylhexyl)oxycarbonyl]cyclohexane sulfonate (a compound shown below) was obtained.

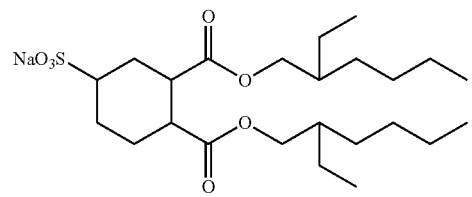

(2) Production of Polyaniline Composite 1.32 g of polyaniline composite 2 was obtained in the same manner as in Production Example 1, except that 2.0 g of sodium 3,4-bis[(2-ethylhexyl)oxycarbonyl]cyclohexanesulfonate was used instead of Aerosol OT.

For the thus prepared polyaniline composite 2, the chlorine content was measured by the combustion-ion chromatography in the same manner as that mentioned above. As a result, it was confirmed that the chlorine content was equal to or less than the above-mentioned measureable limit; i.e. the chlorine content was 0.0001 wt % or less.

Further, for the thus prepared polyaniline composite 2, the phosphorus content was measured in the same manner as that mentioned above. As a result, it was confirmed that the phosphorus content was 180 wt ppm.

Production Example 3

Production of Polyaniline Composite 3

1.8 g of Aerosol OT (sodium diisooctylsulfosuccinate) was dissolved in 50 mL of toluene. The resulting solution was placed in a 500 mL-separable flask in the nitrogen stream. Further, 1.8 mL of aniline was added to this solution. Thereafter, 150 mL of 0.1N hydrochloric acid was added to the solution, and the solution temperature was cooled to 5° C. When the internal temperature of the solution reached 5° C., a solution obtained by dissolving 3.6 g of ammonium peroxide in 50 mL of 0.1 N hydrochloric acid was added dropwise for 2 hours by means of a dropping funnel. For 18 hours after the start of the dropwise addition, a reaction was conducted while keeping the internal temperature at 5° C. Thereafter, 125 mL of toluene was added, the reaction temperature was increased to 25° C. The reaction was continued for 4 hours. Thereafter, by allowing the solution to stand, the solution was separated into two phases. An aqueous phase was separated, and a toluene phase was washed twice with 50 mL of ion exchange water, and once with 50 mL of 0.1N hydrochloric acid, whereby a toluene solution of a polyaniline composite (protonated polyaniline) was obtained.

A small amount of insoluble matters contained in the resulting composite solution was removed by means of #5C filter paper, whereby the polyaniline composite toluene solution was collected. This solution was transferred to an evaporator, and heated in a hot water bath of 60° C. The pressure was reduced to distill volatile matters off, whereby 1.25 g of a polyaniline composite 3 was obtained.

The chlorine content of the thus prepared polyaniline composite 3 was measured by the combustion-ion chromatography method in the same manner as that mentioned above, and the chlorine content was confirmed to be 800 wt ppm.

The phosphorus content of the thus prepared polyaniline composite 3 was measured by the inductively coupled plasma method in the same manner as that mentioned above, it was confirmed that the phosphorus content was 100 wt ppm or less which is equal to or lower than the measurable limit of this method.

Production Example 4

Production of Polyaniline Composite 4

1.8 g of Aerosol OT (sodium diisooctylsulfosuccinate) was dissolved in 50 mL of toluene. The resulting solution was placed in a 500 mL-separable flask in the nitrogen stream. Further, 1.8 mL of aniline was added to this solution. Thereafter, 150 mL of 1N hydrochloric acid was added to the solution, and the solution temperature was cooled to 5° C.

When the internal temperature of the solution reached 5° C., a solution obtained by dissolving 3.6 g of ammonium peroxide in 50 mL of 1 N hydrochloric acid was added dropwise for 2 hours by means of a dropping funnel. For 18 hours after the start of the dropwise addition, a reaction was conducted while keeping the internal temperature at 5° C. Thereafter, 125 mL of toluene was added, the reaction temperature was increased to 25° C. The reaction was continued for 4 hours. Thereafter, by allowing the solution to stand, the solution was separated into two phases. An aqueous phase was separated, and a toluene phase was washed twice with 50 mL of ion exchange water, and once with 50 mL of 1 N hydrochloric acid, whereby a toluene solution of a polyaniline composite (protonated polyaniline) was obtained.

A small amount of insoluble matters contained in the resulting composite solution was removed by means of #5C filter paper, whereby the polyaniline composite toluene solution was collected. This solution was transferred to an evaporator, and heated in a hot water bath of 60° C. The pressure was reduced to distill volatile matters off, whereby 1.25 g of polyaniline composite 4 was obtained.

The chlorine content of the thus prepared polyaniline composite 4 was measured by the combustion-ion chromatography method in the same manner as that mentioned above, and the chlorine content was confirmed to be 6200 wt ppm.

The phosphorus content of the thus prepared polyaniline composite 4 was measured by the inductively coupled plasma method in the same manner as that mentioned above, it was confirmed that the phosphorus content was 100 wt ppm or less which is equal to or lower than the measurable limit of this method.

Since the method of measuring the chlorine content and the phosphorus content in the following examples is the same as that mentioned above, the description thereof is omitted.

Example 1

0.1 g of the polyaniline composite 1 prepared in Example 1 was re-dissolved in toluene (the first grade, manufactured by Wako Pure Chemical Industries, Ltd.) to prepare a 5 wt % solution. To this solution, as the second dopant, 0.1 g of 3-ethylphenol (manufactured by Tokyo Chemical Industry Co., Ltd.) was added, and the resultant was mixed with stirring at 30° C. for 2 hours. The resulting solution was formed into a film by spin coating, whereby a conductive film was formed on an ITO (indium tin oxide) substrate by the spin coating method. The intrinsic conductivity was measured by the four probe method. The results are shown in Table 1. The chlorine content of the polyaniline solution was 0.0001 wt % or less.

The phosphorus content of the polyaniline solution was 100 wt ppm or less which is equal to or smaller than the measurable limit of this method.

Example 2

A conductive film was formed in the same manner as in Example 1, except that the amount of 3-ethylphenol was changed to 0.4 g. The intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 3

A conductive film was formed in the same manner as in Example 1, except that 0.1 g of 4-ethylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 4

A conductive film was formed in the same manner as in Example 1, except that 0.4 g of 4-ethylphenol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 5

A conductive film was formed in the same manner as in Example 1, except that 0.1 g of 3-isopropylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 6

A conductive film was formed in the same manner as in Example 1, except that 0.4 g of 3-isopropylphenol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 7

A conductive film was formed in the same manner as in Example 1, except that 0.1 g of 4-isopropylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 8

A conductive film was formed in the same manner as in Example 1, except that 0.4 g of 4-isopropylphenol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 9

A conductive film was formed in the same manner as in Example 1, except that 0.1 g of 3-tert-butylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 10

A conductive film was formed in the same manner as in Example 1, except that 0.4 g of 3-tert-butylphenol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 11

A conductive film was formed in the same manner as in Example 1, except that 0.1 g of 4-tert-butylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 12

A conductive film was formed in the same manner as in Example 1, except that 0.4 g of 4-tert-butylphenol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 13

A conductive film was formed in the same manner as in Example 1, except that 0.1 g of 4-aminophenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 14

A conductive film was formed in the same manner as in Example 1, except that 0.1 g of 4-tert-pentylphenol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 15

A conductive film was formed in the same manner as in Example 1, except that 0.1 g of α-naphthol (manufactured by Tokyo Chemical Industry Co., Ltd.) was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 16

A conductive film was formed in the same manner as in Example 1, except that 0.4 g of α-naphthol was added instead of 3-ethylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 17

0.1 g of the polyaniline composite 2 prepared in the Production Example 2 was re-dissolved in toluene, whereby a 5 wt % solution was prepared. To this solution, 0.4 g of 4-tert-butylphenol (manufactured by Tokyo Chemical Industry Co., Ltd.) was added as the second dopant, and the resultant was mixed with stirring for 2 hours at 30° C. This solution was formed into a film by the spin coating method, whereby a conductive film was formed on the ITO (indium tin oxide) substrate by the spin coating method. The intrinsic conductivity of the film was measured by the four probe method. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 18

A conductive film was formed in the same manner as in Example 17, except that 0.4 g of α-naphthol (manufactured by Tokyo Chemical Industry Co., Ltd.) was added instead of 4-tert-butylphenol, and the intrinsic conductivity of the film was measured. The results are shown in Table 1. The chlorine content of the polyaniline solution was 0.0001 wt % or less.

The phosphorus content of the polyaniline solution was 100 wt ppm or less which is equal to or less than the measurable limit of this method.

Example 19

0.1 g of the polyaniline composite 3 prepared in Production Example 3 was re-dissolved in toluene to prepare a 5 wt % solution. To this solution, as the second dopant, 0.1 g of 4-tert-butylphenol (manufactured by Tokyo Chemical Industry Co., Ltd.) was added, and the resultant was mixed with stirring at 30° C. for 2 hours. The resulting solution was formed into a film by spin coating, whereby a conductive film was formed on an ITO (indium tin oxide) substrate by the spin coating method. The intrinsic conductivity was measured by the four probe method. The results are shown in Table 1. The chlorine content of the polyaniline solution was 0.004 wt % or less.

The phosphorus content of the polyaniline solution was 100 wt ppm or less which is equal to or smaller than the measurable limit of this method.

Example 20

A conductive film was formed in the same manner as in Example 19, except that 0.1 g of α-naphthol (manufactured by Tokyo Chemical Industry Co., Ltd.) was added instead of 4-tert-butylphenol, and the intrinsic conductivity of the film was measured. The results are shown in Table 1. The chlorine content of the polyaniline solution was 0.004 wt % or less.

The phosphorus content of the polyaniline solution was 100 wt ppm or less which is equal to or less than the measurable limit of this method.

Comparative Example 1

A conductive film was formed in the same manner as in Example 1, except that 3-ethylphenol was not added, and the intrinsic conductivity of the film was measured. The results are shown in Table 1.

The phosphorus content of the polyaniline solution was 100 wt ppm or less which is equal to or less than the measurable limit of this method.

Comparative Example 2

A conductive film was formed in the same manner as in Example 1, except that 0.1 g of m-cresol (manufactured by Tokyo Chemical Industry Co., Ltd.) was added instead of 3-ethylphenol, and the intrinsic conductivity of the film was measured. The results are shown in Table 1.

The phosphorus content of the polyaniline solution was 100 wt ppm or less which is equal to or less than the measurable limit of this method.

Comparative Example 3

0.1 g of the polyaniline composite 4 prepared in Production Example 4 was re-dissolved in toluene (the first grade, manufactured by Wako Pure Chemical Ltd.) to prepare a 5 wt % solution. To this solution, as the second dopant, 0.1 g of m-cresol (manufactured by Tokyo Chemical Industry Co., Ltd.) was added, and the resultant was mixed with stirring at 30° C. for 2 hours to produce a polyaniline solution. The chlorine content of the polyaniline solution was 0.03 wt %. The resulting solution was formed into a film by spin coating, whereby a conductive film was formed on an ITO (indium tin oxide) substrate by the spin coating method. The intrinsic conductivity was measured by the four probe method. The results are shown in Table 1.

The phosphorus content of the polyaniline solution was 100 wt ppm or less which is equal to or smaller than the measurable limit of this method.

Comparative Example 4

A conductive film was formed in the same manner as in Comparative Example 3, except that 0.1 g of 4-tert-butylphenol (manufactured by Tokyo Chemical Industry Co., Ltd.) was added instead of m-cresol. The intrinsic conductivity was measured by the four probe method. The results are shown in Table 1

The chlorine content of the polyaniline solution was 0.031 wt %.

The phosphorus content of the polyaniline solution was 100 wt ppm or less which is equal to or less than the measurable limit of this method.

TABLE 1

| | Conductive polymer | | Second dopant | | Intrinsic conductivity [S/m] |
|---|---|---|---|---|---|
| | Name of compound | Amount added | Name of compound | Added amount | |
| Example 1 | Polyaniline 1 | 0.1 g | 3-Ethylphenol | 0.1 g | 90 |

TABLE 1-continued

| | Conductive polymer | | Second dopant | | Intrinsic conductivity [S/m] |
|---|---|---|---|---|---|
| | Name of compound | Amount added | Name of compound | Added amount | |
| Example 2 | Polyaniline 1 | 0.1 g | 3-Ethylphenol | 0.4 g | 110 |
| Example 3 | Polyaniline 1 | 0.1 g | 4-Ethylphenol | 0.1 g | 87 |
| Example 4 | Polyaniline 1 | 0.1 g | 4-Ethylphenol | 0.4 g | 115 |
| Example 5 | Polyaniline 1 | 0.1 g | 3-Isopropylphenol | 0.1 g | 120 |
| Example 6 | Polyaniline 1 | 0.1 g | 3-Isopropylphenol | 0.4 g | 152 |
| Example 7 | Polyaniline 1 | 0.1 g | 4-Isopropylphenol | 0.1 g | 118 |
| Example 8 | Polyaniline 1 | 0.1 g | 4-Isopropylphenol | 0.4 g | 143 |
| Example 9 | Polyaniline 1 | 0.1 g | 3-tert-Butylphenol | 0.1 g | 140 |
| Example 10 | Polyaniline 1 | 0.1 g | 3-tert-Butylphenol | 0.4 g | 165 |
| Example 11 | Polyaniline 1 | 0.1 g | 4-tert-Butylphenol | 0.1 g | 163 |
| Example 12 | Polyaniline 1 | 0.1 g | 4-tert-Butylphenol | 0.4 g | 163 |
| Example 13 | Polyaniline 1 | 0.1 g | 4-Amylphenol | 0.1 g | 80 |
| Example 14 | Polyaniline 1 | 0.1 g | 4-tert-pentylphenol | 0.4 g | 85 |
| Example 15 | Polyaniline 1 | 0.1 g | α-Naphthol | 0.1 g | 120 |
| Example 16 | Polyaniline 1 | 0.1 g | α-Naphthol | 0.4 g | 120 |
| Example 17 | Polyaniline 2 | 0.1 g | 4-tert-Butylphenol | 0.1 g | 155 |
| Example 18 | Polyaniline 2 | 0.1 g | α-Naphthol | 0.4 g | 132 |
| Example 19 | Polyaniline 3 | 0.1 g | 4-tert-Butylphenol | 0.1 g | 110 |
| Example 20 | Polyaniline 3 | 0.1 g | α-Naphthol | 0.1 g | 100 |
| Com. Ex. 1 | Polyaniline 1 | 0.1 g | — | — | 0.02 |
| Com. Ex. 2 | Polyaniline 1 | 0.1 g | m-Cresole | 0.1 g | 25 |
| Com. Ex. 3 | Polyaniline 4 | 0.1 g | m-Cresole | 0.1 g | 240 |
| Com. Ex. 4 | Polyaniline 4 | 0.1 g | 4-tert-Butylphenol | 0.1 g | 60 |

Example 21

0.7 g of para-tert-butylphenol (pTBPh) (manufactured by Tokyo Chemical Industry Co., Ltd.) was added to 2.5 g of isopropyl alcohol (IPA) (manufactured by Tokyo Chemical Industry Co., Ltd.) to allow it to be dissolved. Further, 0.1 g of the polyaniline composite 1 prepared in Production Example 1 was added, followed by stirring, whereby a solution in which the composite 1 was homogenously dissolved was obtained. This solution was formed into a thin film on a glass substrate by spin coating, and conductivity was measured by the four probe method (Loresta GP manufactured by Mitsubishi Chemical Analytech Co., Ltd.). The results are shown in Table 2.

The phosphorus content of the polyaniline solution was 100 wt ppm or less which is equal to or less than the measurable limit of this method.

Example 22

A thin film was formed in the same manner as in Example 21, except that propanol (PrOH) was added instead of IPA, and conductivity was measured. The results are shown in Table 2.

The phosphorus content of the polyaniline solution was 100 wt ppm or less which is equal to or less than the measurable limit of this method.

Example 23

A thin film was formed in the same manner as in Example 21, except that octanol (OcOH) (manufactured by Tokyo Chemical Industry Co., Ltd.) was added instead of IPA, and conductivity was measured. The results are shown in Table 2.

The phosphorus content of the polyaniline solution was 100 wt ppm or less which is equal to or less than the measurable limit of this method.

Example 24

A thin film was formed in the same method as in Example 21, except that the amount of IPA was changed to 1.6 g and 1.6 g of 4-ethylphenol (4EtPh) was added instead of pTBPh, and conductivity was measured. The results are shown in Table 2.

The phosphorus content of the polyaniline solution was 100 wt ppm or less which is equal to or less than the measurable limit of this method.

Example 25

A thin film was formed in the same method as in Example 24 except that 4-isopropylphenol (4IPPh) (manufactured by Tokyo Chemical Industry Co., Ltd.) was added instead of 4EtPh, and conductivity was measured. The results are shown in Table 2.

Comparative Example 5

An attempt was made to prepare a solution in the same manner as in Example 21 except that the amount of IPA was changed to 2.9 g and the amount of pTBPh was changed to 0.3 g. However, the polyaniline composite 1 was not dissolved and hence a thin film could not be formed. The results are shown in Table 2.

The phosphorus content of the polyaniline solution was 100 wt ppm or less which is equal to or less than the measurable limit of this method.

TABLE 2

| | Alcohol | Phenol | Alcohol:Phenol (weight ratio) | Solubility | Conductivity [S/cm] |
|---|---|---|---|---|---|
| Example 21 | IPA | pTBPh | 10:3 | ○ | 41.5 |
| Example 22 | PrOH | pTBPh | 10:3 | ○ | 47.1 |
| Example 23 | OcOH | pTBPh | 10:3 | ○ | 11.5 |
| Example 24 | IPA | 4EtPh | 10:10 | ○ | 69.0 |
| Example 25 | IPA | 4IPPh | 16:1 | ○ | 27.4 |
| Com. Ex. 5 | IPA | pTBPh | 10:1 | X | — |

Example 26

A conductive film was formed in the same manner as in Example 1, except that 0.1 g of 4-tert-amylphenol (manufactured by Tokyo Chemical Industry Co., Ltd.) was added instead of 3-ethylphenol, and the intrinsic conductivity was measured and found to be 56 S/cm. The chlorine content of the polyaniline solution was 0.0001 wt % or less.

The phosphorus content of the polyaniline solution was 100 wt ppm or less which is equal to or less than the measurable limit of this method.

Example 27

0.5 g of the polyaniline composite 1 prepared in Production Example 1, 3.3 g of isopropyl alcohol (manufactured by Tokyo Chemical Industry Co., Ltd.) and 3.3 g of 4-tert-amylphenol (manufactured by Tokyo Chemical Industry Co., Ltd.) were mixed, followed by stirring to prepare a homogenous solution. This solution was formed into a film in the same manner as in Example 1, and the intrinsic conductivity of the film was measured. The intrinsic conductivity was found to be 42 S/cm. The chlorine content of the polyaniline solution was 0.0001 wt % or less.

The phosphorus content of the polyaniline solution was 100 wt ppm or less which is equal to or less than the measurable limit of this method.

INDUSTRIAL APPLICABILITY

The conductive composition of the invention can be used, in the field of power electronics and optoelectronics, as antistatic materials, transparent electrode and conductive film materials, materials for an electroluminescence device, materials for a circuit, electro-magnetic shielding materials, dielectrics and electrolytes of a condenser and polar materials of a solar cell and a secondary battery and materials for a fuel cell separator, or a backing for plating, an anti-corrosive agent or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A conductive composition comprising:
a solvent;
a π-conjugated conductive polyaniline having a chlorine content of 0.6 wt % or less; and
a compound represented by the following formula (1);
wherein the π-conjugated conductive polyaniline is dissolved and
the weight ratio of the compound represented by the formula (1) to the π-conjugated conductive polyaniline (compound represented by the formula (1)/π-conjugated conductive polyaniline) is 0.01 to 22.0;

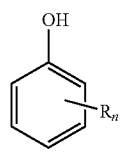

(1)

wherein n is an integer of 1 to 5; and
R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

2. A conductive composition comprising:
a solvent; and
a π-conjugated conductive polyaniline having a chlorine content of 0.6 wt % or less; and
a compound represented by the following formula (2);
wherein the π-conjugated conductive polyaniline is dissolved and
the weight ratio of the compound represented by the formula (2) to the π-conjugated conductive polyaniline (compound represented by the formula (2)/π-conjugated conductive polyaniline) is 0.01 to 5.0;

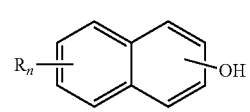

(2)

wherein n is an integer of 0 to 6; and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, and an alkylaryl group having 7 to 30 carbon atoms or an arylalkyl group having 7 to 30 carbon atoms.

3. The conductive composition according to claim 1, wherein
the chlorine content of the conductive composition is 0.02 wt % or less.

4. The conductive composition according to claim 2, wherein
the chlorine content of the conductive composition is 0.02 wt % or less.

5. The conductive composition according to claim 1, wherein the π-conjugated conductive polyaniline is a π-conjugated conductive polyaniline which is doped with an organic sulfonic acid.

6. The conductive composition according to claim 1, wherein the π-conjugated conductive polyaniline is a protonated substituted or unsubstituted polyaniline.

7. The conductive composition according to claim 1, wherein the π-conjugated conductive polyaniline is protonated substituted or unsubstituted polyaniline, and the substituted or unsubstituted polyaniline comprises phosphorus.

8. The conductive composition according to claim 1, wherein the π-conjugated conductive polyaniline is protonated substituted or unsubstituted polyaniline,
the solvent is an alcohol having 3 or more carbon atoms,
the weight ratio of the alcohol to the substituted unsubstituted polyaniline (alcohol/substituted or unsubstituted polyaniline) is 5.0 to 27.0, and
the weight ratio of the compound represented by the formula (1) to the substituted or unsubstituted polyaniline (compound represented by the formula (1)/substituted or unsubstituted polyaniline) is 5.0 to 20.0.

9. A conductive composition comprising:
substituted or unsubstituted polyaniline having a chlorine content of 0.6 wt % or less,
a compound represented by the following formula (1), and
an alcohol having 3 or more carbon atoms,
wherein the weight ratio of the alcohol to the substituted or unsubstituted polyaniline (alcohol/substituted or unsubstituted polyaniline) is 12.0 to 27.0,
the weight ratio of the compound represented by the formula (1) to the substituted or unsubstituted polyaniline (compound represented by the formula (1)/substituted or unsubstituted polyaniline) is 5.0 to 20.0, and the substituted or unsubstituted polyaniline is dissolved;

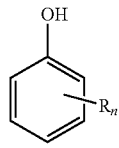
(1)

wherein n is an integer of 1 to 5, and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 7 to 30 carbon atoms or an arylalkyl group having 7 to 30 carbon atoms.

10. The conductive composition according to claim 9, wherein the chlorine content of the conductive composition is 0.02 wt % or less.

11. The conductive composition according to claim 9, wherein the chlorine content of the substituted or unsubstituted polyaniline is 0.1 wt % or less.

12. The conductive composition according to claim 9, wherein the substituted or unsubstituted polyaniline is doped with an organic acid.

13. The conductive composition according to claim 9, wherein the substituted or unsubstituted polyaniline is protonated by an organic protonic acid or its salt represented by the following formula (3);

A-R₁ (3)

wherein A is sulfonic acid, selenic acid, phosphonic acid, carboxylic acid, hydrogen sulfate, hydrogen selenate or hydrogen phosphate; and R₁ is carboxylic acid, an alkyl group having 1 to 20 carbon atoms, an alkenyl group having 1 to 20 carbon atoms, an alkoxy group having 1 to 20 carbon atoms, an alkanoyl group having 1 to 20 carbon atoms, an alkylthio group having 1 to 20 carbon atoms, an alkylthioalkyl group having 1 to 20 carbon atoms, an alkylaryl group having 1 to 20 carbon atoms, an arylalkyl group having 1 to 20 carbon atoms, an alkylsulfinyl group having 1 to 20 carbon atoms, an alkoxyalkyl group having 1 to 20 carbon atoms, an alkylsulfonyl group having 1 to 20 carbon atoms, an alkoxycarbonyl group having 1 to 20 carbon atoms or alkylsuccinic acid having 1 to 20 carbon atoms.

14. The conductive composition according to claim 9, wherein the substituted or unsubstituted polyaniline comprises phosphorus.

15. The conductive composition according to claim 1, which further comprises phosphorus.

16. A conductive layered product comprising:
a substrate; and
a conductive layer comprising the conductive composition according to claim 1, wherein the conductive layer is stacked on the substrate.

17. A conductive layered product comprising:
a substrate; and
a conductive layer produced from the conductive composition according to claim 1, wherein the conductive layer is stacked on the substrate.

18. The conductive layered product according to claim 16, wherein the substrate is a resin film.

19. A conductive product obtained by forming the conductive layered product according to claim 16.

20. A condenser which comprises the conductive composition according to claim 1.

21. A conductive film obtained by forming the conductive composition according to claim 1.

22. A conductive product obtained by mixing the conductive composition according to claim 1 and a substrate.

23. The conductive composition according to claim 1, wherein the chlorine content of the π-conjugated conductive polyaniline is 0.1 wt % or less.

24. The conductive composition according to claim 1, wherein the chlorine content of the π-conjugated conductive polyaniline is 0.04 wt % or less.

25. The conductive composition according to claim 2, wherein the chlorine content of the π-conjugated conductive polyaniline is 0.04 wt % or less.

26. The conductive composition according to claim 1, wherein, in the formula (1), n is 1 and R is an alkyl group having 2 to 10 carbon atoms.

27. The conductive composition according to claim 1, wherein the π-conjugated conductive polyaniline is a substituted or unsubstituted polyaniline protonated by an organic protonic acid or its salt represented by the following formula (5):

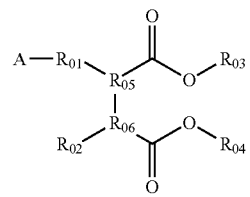
(5)

wherein $R_{01}$ is a single bond or an alkylene group having 1 to 4 carbon atoms; $R_{02}$ is a hydrogen atom or an alkyl group having 1 to 4 carbon atoms; $R_{05}$ and $R_{06}$ are independently a methine group or an ethine group; $R_{01}$ and $R_{04}$ are independently a hydrogen atom or an alkyl group having 4 to 24 carbon atoms; and A is sulfonic acid, selenic acid, phosphonic acid, carboxylic acid, hydrogen sulfate, hydrogen selenate or hydrogen phosphate.

28. The conductive composition according to claim 27, wherein the organic protonic acid or its salt is sodium dioctyl sulfosuccinate.

29. The conductive composition according to claim 2, wherein the π-conjugated conductive polyaniline is a substituted or unsubstituted polyaniline protonated by an organic protonic acid or its salt represented by the following formula (5):

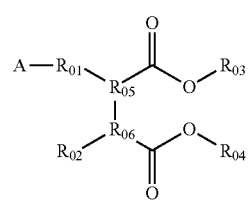
(5)

wherein $R_{01}$ is a single bond or an alkylene group having 1 to 4 carbon atoms; $R_{02}$ is a hydrogen atom or an alkyl group having 1 to 4 carbon atoms; $R_{05}$ and $R_{06}$ are independently a methine group or an ethine group; $R_{01}$ and $R_{04}$ are independently a hydrogen atom or an alkyl group having 4 to 24 carbon atoms; and A is sulfonic acid, selenic acid, phosphonic acid, carboxylic acid, hydrogen sulfate, hydrogen selenate or hydrogen phosphate.

30. The conductive composition according to claim 29, wherein the organic protonic acid or its salt is sodium dioctyl sulfosuccinate.

31. The conductive composition according to claim 1,
wherein the chlorine content of the π-conjugated conductive polyaniline is 0.04 wt % or less,
wherein formula (1) n is 1 and R is an alkyl group having 2 to 10 carbon atoms, and
wherein the π-conjugated conductive polyaniline is a substituted or unsubstituted polyaniline protonated by sodium dioctyl sulfosuccinate.

* * * * *